United States Patent
Li et al.

(10) Patent No.: US 11,582,371 B2
(45) Date of Patent: Feb. 14, 2023

(54) CAMERA MODULE OF REDUCED SIZE IN TWO DIMENSIONS AND ELECTRONIC DEVICE INCLUDING THE SAME

(71) Applicant: TRIPLE WIN TECHNOLOGY (SHENZHEN) CO. LTD., Shenzhen (CN)

(72) Inventors: Jing-Wei Li, Guangdong (CN); Sheng-Jie Ding, Guangdong (CN); Jian-Chao Song, Guangdong (CN); Yu-Shuai Li, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/366,373

(22) Filed: Jul. 2, 2021

(65) Prior Publication Data
US 2022/0006929 A1    Jan. 6, 2022

(30) Foreign Application Priority Data
Jul. 3, 2020    (CN) .......................... 202010635249.5

(51) Int. Cl.
*H04N 5/225*    (2006.01)
*G03B 17/56*    (2021.01)

(52) U.S. Cl.
CPC ......... *H04N 5/2254* (2013.01); *G03B 17/561* (2013.01); *H04N 5/2252* (2013.01)

(58) Field of Classification Search
CPC .. H04N 5/2254; H04N 5/2252; H04N 5/2257; H04N 5/2251; G03B 17/561; F16M 11/04
See application file for complete search history.

(56) References Cited

U.S. PATENT DOCUMENTS

| | | | | |
|---|---|---|---|---|
| 10,951,802 B2* | 3/2021 | Hsu | ...................... | H04N 5/2258 |
| 11,095,090 B2* | 8/2021 | Shi | ...................... | H04N 9/3161 |
| 2015/0281532 A1* | 10/2015 | Yu | ......................... | H04N 5/2254 |
| | | | | 348/373 |

(Continued)

FOREIGN PATENT DOCUMENTS

| | | |
|---|---|---|
| CN | 204334748 U | 5/2015 |
| CN | 104917944 A | 9/2015 |
| TW | 202016636 A | 5/2020 |

*Primary Examiner* — Lin Ye
*Assistant Examiner* — John H Morehead, III
(74) *Attorney, Agent, or Firm* — ScienBiziP, P.C.

(57) ABSTRACT

A camera module miniaturized in both width and length includes a baseplate, a lens assembly, and a bracket. The bracket includes a support plate and a support member disposed on the support plate. The support plate includes a first surface facing away from the baseplate and a second surface facing the baseplate. The support plate defines a first opening penetrating the first surface and the second surface. The lens assembly is disposed on the first surface and completely covers the first opening. The support member is located between the support plate and the baseplate. The support member includes a first support portion and a plurality of second support portions arranged at intervals, the first support portion is disposed on the second surface and surrounds the peripheral edge of the first opening. Each second support portion extends outwards from an outer surface of the first support portion.

18 Claims, 8 Drawing Sheets

(56) References Cited

U.S. PATENT DOCUMENTS

| | | | |
|---|---|---|---|
| 2017/0052342 A1* | 2/2017 | Shin | H04N 5/2253 |
| 2017/0082827 A1* | 3/2017 | Park | H04N 5/2251 |
| 2018/0275368 A1* | 9/2018 | Lee | G03B 5/00 |
| 2018/0309916 A1* | 10/2018 | Park | H04N 5/2254 |
| 2019/0246490 A1* | 8/2019 | Li | H04N 5/2258 |
| 2020/0018949 A1* | 1/2020 | Ma | H01L 27/14618 |
| 2020/0068104 A1* | 2/2020 | Hsu | H04N 5/2258 |
| 2020/0120801 A1* | 4/2020 | Li | H04N 5/2257 |
| 2020/0285018 A1* | 9/2020 | Zhang | G02B 7/006 |

* cited by examiner

CAMERA MODULE OF REDUCED SIZE IN TWO DIMENSIONS AND ELECTRONIC DEVICE INCLUDING THE SAME

FIELD

The subject matter herein generally relates to optical devices, and more particularly to a camera module and an electronic device including the camera module.

BACKGROUND

Cameras are in widespread use and are being combined with many electronic products, such as mobile phones and computers. In order to realize the miniaturization of electronic products, the cameras should also be miniaturized.

BRIEF DESCRIPTION OF THE DRAWINGS

Implementations of the present technology will now be described, by way of embodiment, with reference to the attached figures.

DETAILED DESCRIPTION

Figure 1:
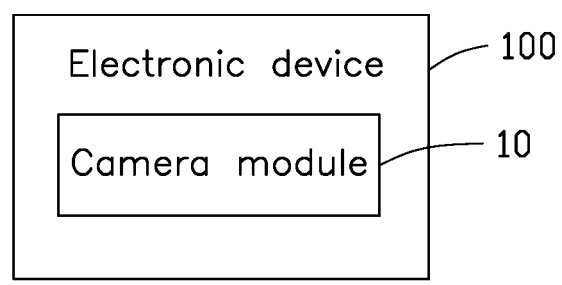
FIG. 1 is a block diagram of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Referring to FIG. 1, an electronic device 100 is illustrated. The electronic device 100 includes a camera module 10. The electronic device may be, but is not limited to being, a mobile phone, a computer, a wearable device, or a monitoring device.

Figure 2:
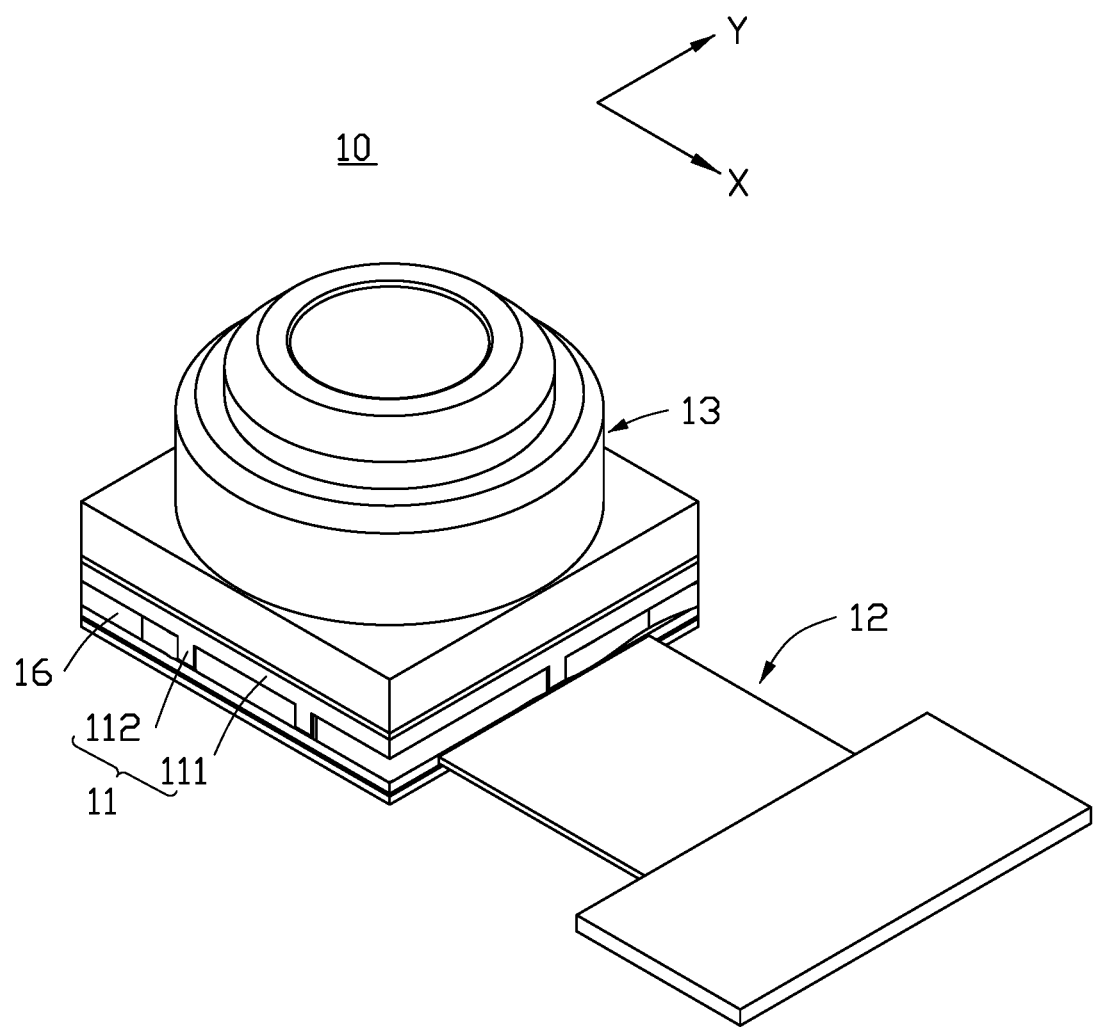
FIG. 2 is an isometric view of an embodiment of a camera module.
Figure 4:
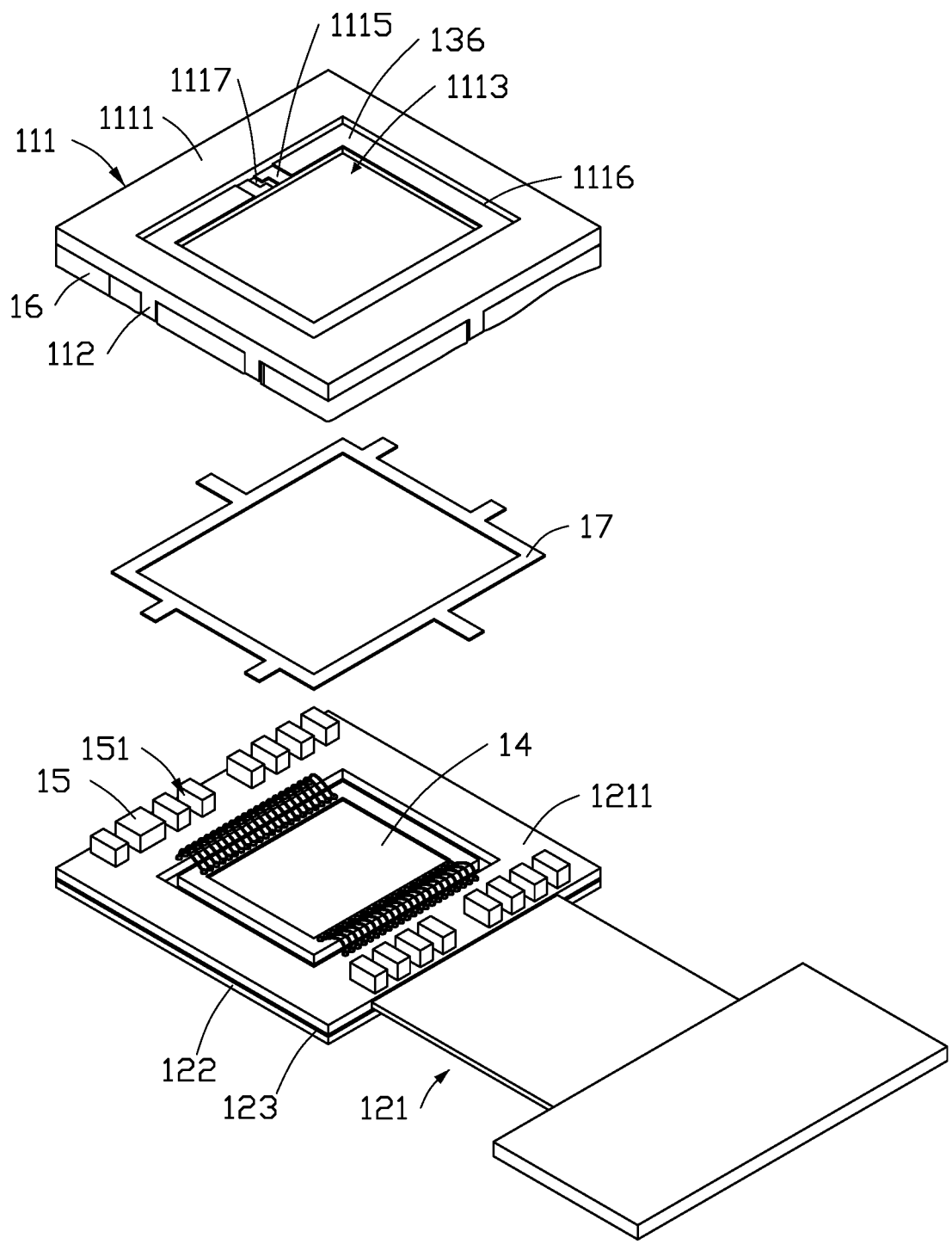
FIG. 4 is an exploded, isometric view of a portion of the camera module of FIG. 2.
Figure 5:
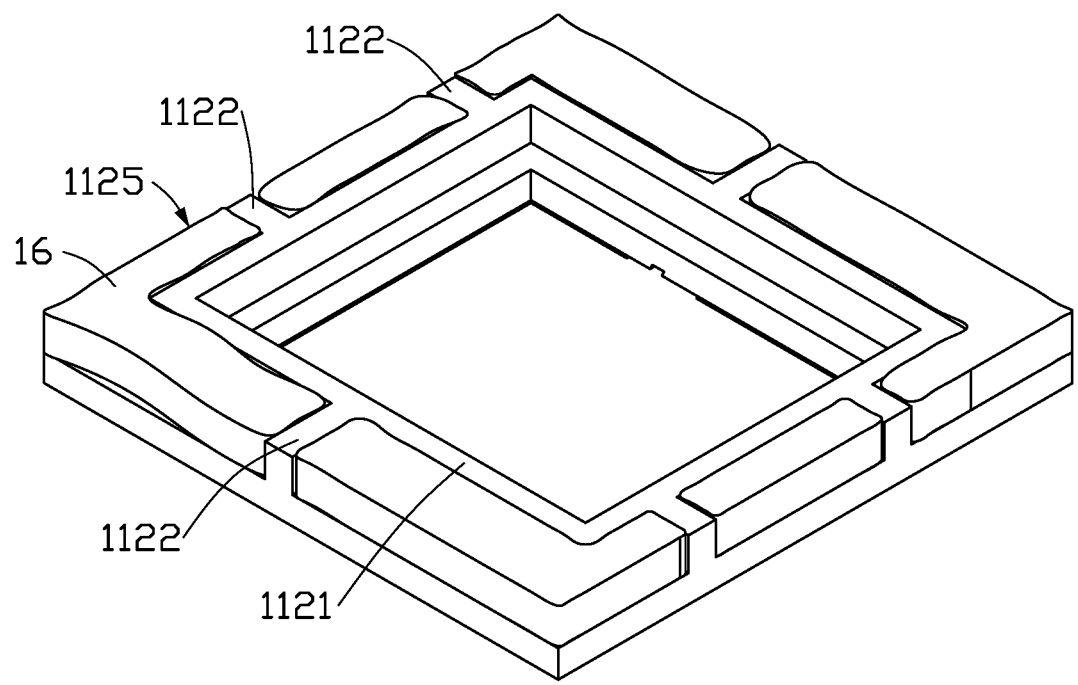
FIG. 5 is an isometric view illustrating assembly of a bracket and a filling member in the camera module of FIG. 4.
Figure 6:
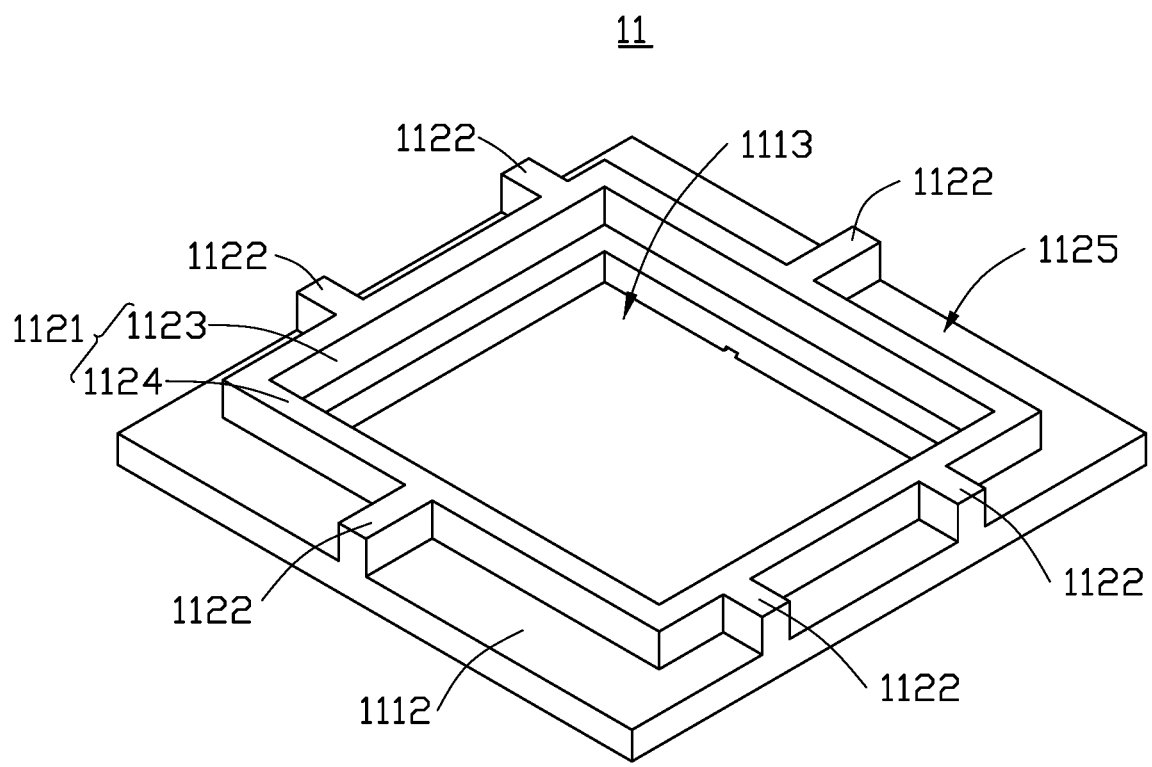
FIG. 6 is an isometric view of the bracket of FIG. 5.

Referring to FIG. 2, the camera module 10 includes a bracket 11, a baseplate 12, and a lens assembly 13. The bracket 11 is arranged between the baseplate 12 and the lens assembly 13. The bracket 11 includes a support plate 111 and a support member 112 arranged on the support plate 111. Referring to FIGS. 4 and 6, the support plate 111 includes a first surface 1111 facing away from the baseplate 12 and a second surface 1112 facing the baseplate 12. The support plate 111 is provided with a first opening 1113 which penetrates the first surface 1111 and the second surface 1112. The lens assembly 13 is arranged on the first surface 1111 and completely covers the first opening 1113. The support member 112 is located between the support plate 111 and the baseplate 12. The support member 112 includes a first support portion 1121 and a plurality of second support portions 1122 arranged on the first support portion 1121 at intervals. The first support portion 1121 is arranged on the second surface 1112 and surrounds the periphery of the first opening 1113. Each of the second support portions 1122 extends outwards from an outer surface of the first support portion 1121 which is facing away from the first opening 1113.

Referring to FIG. 2, a length direction of the camera module 10 is defined as an X-axis direction, and a width direction of the camera module 10 is defined as a Y-axis direction. The Y-axis direction is perpendicular to the X-axis direction.

Figure 8:
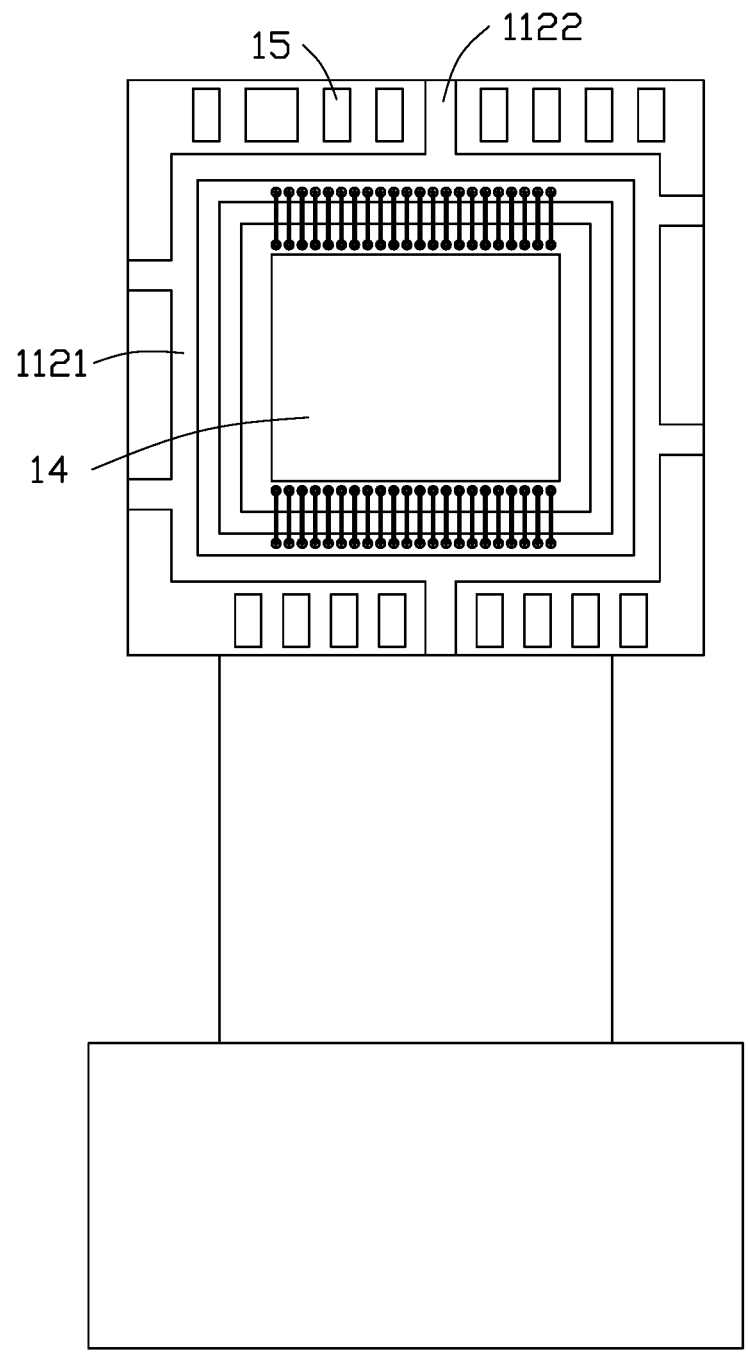
FIG. 8 is a cross-sectional view of the camera module of FIG. 2.

In some embodiments, referring to FIGS. 4 and 8, a projection of the support member 112 onto the support plate 111 is located inside the support plate 111. The support member 112 supports the support plate 111.

The arrangement of the support member 112 and the support plate 111 allows the absence of an outer wall. Thus the size of the camera module 10 in both X-axis and Y-axis directions is decreased, the camera module 10 is thereby miniaturized.

The support plate 111 and the support member 112 are integrally formed.

Referring to FIG. 6, the first opening 1113 is substantially rectangular. The first support portion 1121 is substantially a rectangular ring and includes two opposite first side plates 1123 and two opposite second side plates 1124. Each of the first side plates connects to ends of the two second side plates 1124, and the two first side plates 1123 and the two second side plates 1124 are connected to form a ring surrounding the first opening 1113. A preset distance is defined between the periphery of the first opening 1113 and each of the first side plates 1123 and the second side plates 1124. The support member 112 includes six second support portions 1122. Each first side plate 1123 is provided with two second support portions 1122, and each second side plate 1124 is provided with one second support portion 1122. In another embodiment, the number of the second support portions 1122 can be set according to needs.

The shape of the first opening 1113 can be as desired. The first opening 1113 may have a regular shape such as a diamond or a circle, or another irregular shape. The shape of the first support portion 1121 can be set according to need. The first support portion 1121 may have a regular shape such as a diamond or a circle, or another irregular shape.

Figure 7:
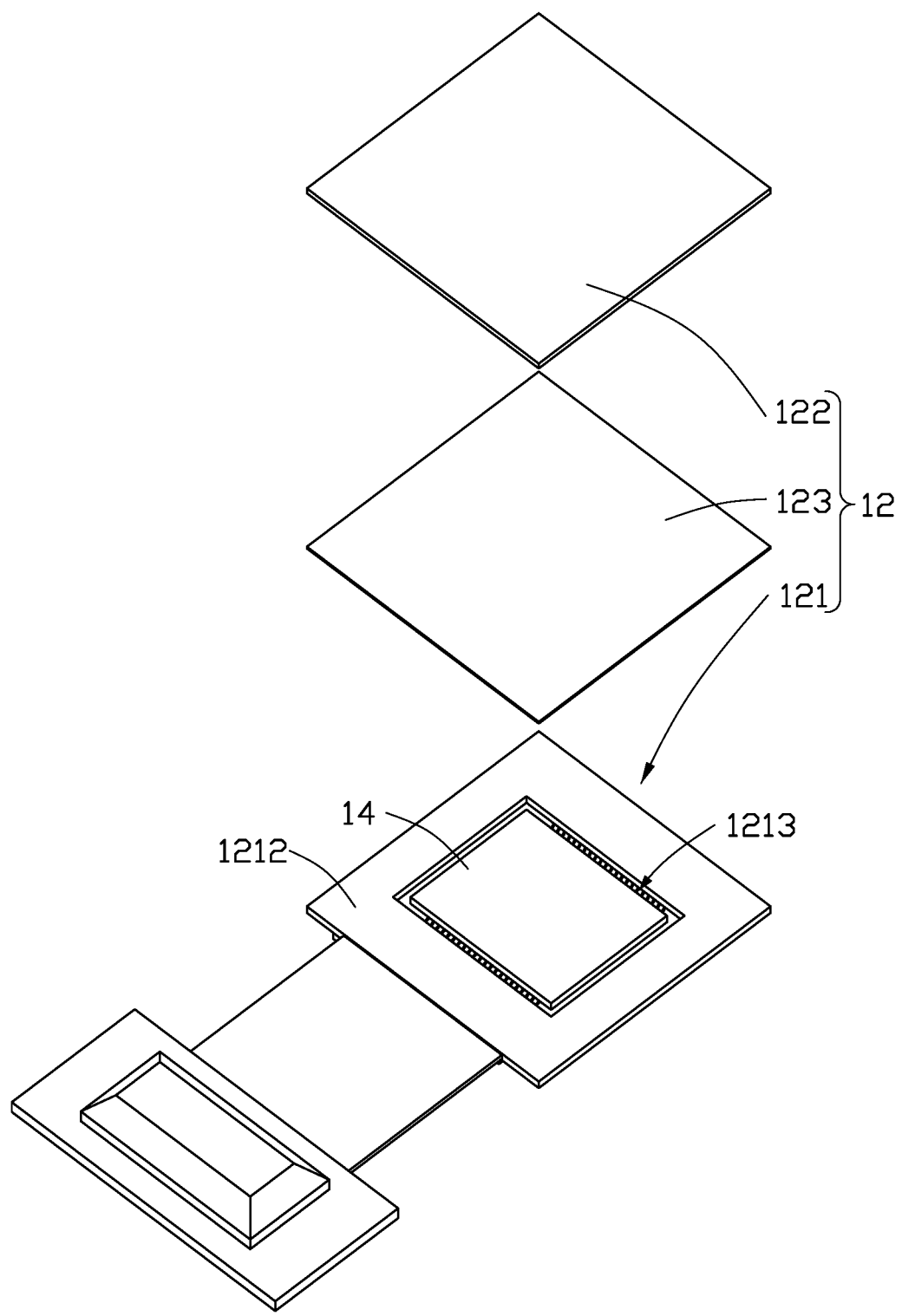
FIG. 7 is similar to FIG. 3, but is viewed from another angle.

Referring to FIGS. 4 and 7, the baseplate 12 includes a circuit board 121 and a heat dissipation plate 122. The circuit board 121 includes a top surface 1211 facing the lens assembly 13 and a bottom surface 1212 facing away from the lens assembly 13. The circuit board 121 defines a second opening 1213. The second opening 1213 penetrates the top surface 1211 and the bottom surface 1212. The heat dissipation plate 122 is disposed on the bottom surface 1212 and covers the second opening 1213. A portion of the heat dissipation plate 122 is exposed to the top surface 1211 from the second opening 1213. The arrangement of the heat dissipation plate 122 strengthens the structural support of the circuit board 121. The heat dissipation plate 122 may be, but is not limited to, a stainless steel plate. The bracket 11 is disposed on the top surface 1211.

The camera module 10 further includes an image sensor 14 electrically connected to the circuit board 121. The image sensor 14 is disposed on the portion of the heat dissipation plate 122 which is exposed to the top surface 1211. The heat generated by the image sensor 14 during operation is transferred to the outside through the heat dissipation plate 122.

Referring to FIGS. 4 and 7, the baseplate 12 further includes a connecting member 123. The connecting member 123 connects the circuit board 121 and the heat dissipation plate 122 to fix the heat dissipation plate 122 to the circuit board 121. The connecting member 123 is disposed on the bottom surface 1212 and covers the second opening 1213. A part of the connecting member 123 is exposed to the top surface 1211 from the second opening 1213. The image sensor 14 is further disposed on the part of the connecting member 123 which is exposed to the top surface 1211. The connecting member 123 allows the heat dissipation plate 122 to be closely fixed to the image sensor 14. In some embodiment, the connecting member 123 is thermally conductive silica gel. So that, the heat generated by the image sensor 14 during operation can be transferred to the outside through the connecting member 123 and the heat dissipation plate 122 in that order.

In another embodiment, the connecting member 123 is not limited to thermally conductive silica gel, and can also be double-sided tape or the like.

In other embodiments, the heat dissipation plate 122 and the connecting member 123 can be omitted. In this way, no second opening 1213 is provided on the circuit board 121.

Figure 3:
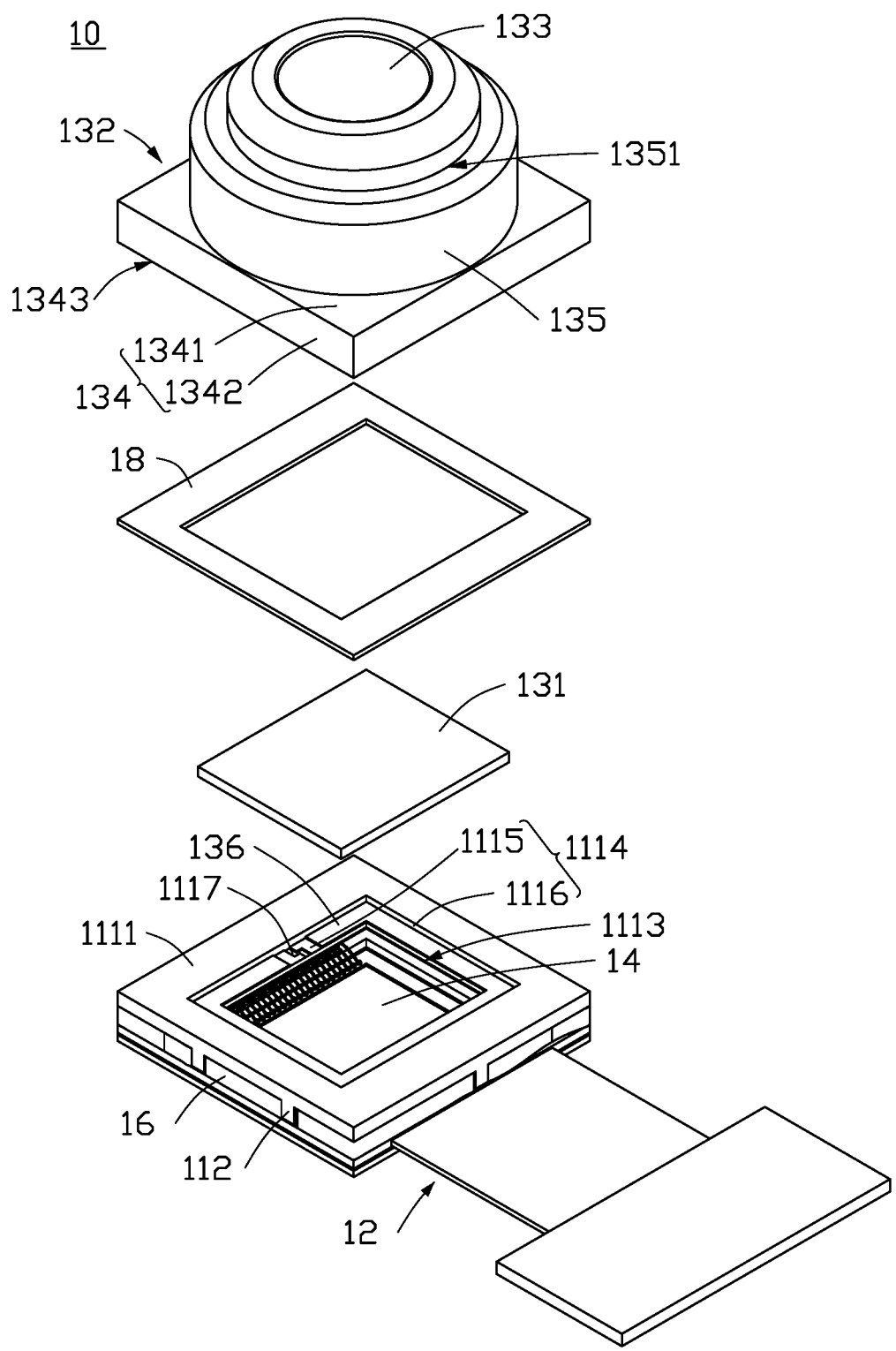
FIG. 3 is an exploded, isometric view of the camera module of FIG. 2.

Referring to FIGS. 3, 4, and 6, when the bracket 11 is disposed on the top surface 1211, the first support portion 1121 is located between the second surface 1112 and the top surface 1211 and surrounds the image sensor 14, to seal the gap between the support plate 111 and the circuit board 121, thereby avoiding light leakage within the camera module 10.

Referring to FIG. 4, several electronic components 15 are disposed on the top surface 1211. The electronic components 15 may be one or more passive components such as resistors, capacitors, diodes, triodes, relays, and memories.

Referring to FIGS. 4 and 8, the electronic components 15 are arranged in two rows, and the image sensor 14 is located between the two rows of electronic components 15. The first support portion 1121 is located between the image sensor 14 and the electronic components 15 to isolate the image sensor 14 from the electronic components 15.

Two adjacent electronic components 15 are spaced apart to form a first gap 151. In this way, when the bracket 11 is disposed on the top surface 1211, each of the second support portions 1122 can be accommodated in a first gap 151.

Referring to FIGS. 3-6 and 8, the camera module 10 further includes a filling member 16. A second gap 1125 is formed between two adjacent second support portions 1122. The filling member 16 infills the second gap 1125 to connect the support member 112, the second surface 1112 of the support plate 111, and the top surface 1211 of the circuit board 121. The filling member 16 also acts as a support and an impact-absorber. The filling member 16 may be, but is not limited to, silica gel or glue.

Referring to FIG. 8, the camera module 10 further includes a first connecting member 17. The first connecting member 17 connects the top surface 1211 and the support member 112. The first connecting member 17 may be, but is not limited to, double-sided tape or glue.

In other embodiments, the first connecting member 17 can be omitted. The first surface 1111 and the support member 112 can be connected by clamping, soldering, screwing, or the like.

Referring to FIGS. 2 and 3, the lens assembly 13 is disposed on the first surface 1111 and covers the first opening 1113. A second connecting member 18 is disposed between the first surface 1111 and the lens assembly 13. The first surface 1111 and the lens assembly 13 are connected via the second connecting member 18. The second connecting member 18 may be, but is not limited to, double-sided tape or glue.

In other embodiments, the second connecting member 18 can be omitted. The first surface 1111 and the lens assembly 13 can be connected by clamping, soldering, screwing, or the like.

Referring to FIGS. 2 and 3, the lens assembly 13 includes an optical filter 131, a lens holder 132, and a lens 133.

The optical filter 131 is disposed on the first surface 1111 and completely covers the first opening 1113. The optical filter 131 filters out undesirable light such as infrared light. The filter 131 may be, but is not limited to, blue glass, or infrared glass.

Referring to FIGS. 2 and 3, the first surface 1111 is recessed toward the second surface 1112 to form a receiving groove 1114. The receiving groove 1114 communicates with the first opening 1113.

Referring to FIGS. 2 and 3, the receiving groove 1114 includes a groove bottom surface 1115 and a groove side surface 1116. The groove side surface 1116 connects the groove bottom surface 1115 and the first surface 1111. The optical filter 131 is disposed on the groove bottom surface 1115 and completely covers the first opening 1113. The groove bottom surface 1115 defines a gas escape groove 1117. The gas escape groove 1117 communicates with the first opening 1113.

Referring to FIGS. 2 and 3, the lens assembly 13 further includes a third connecting member 136. The third connecting member 136 is located between and connecting the groove bottom surface 1115 and the optical filter 131. The third connecting member 136 may be, but is not limited to, double-sided tape or glue.

Referring to FIGS. 2 and 3, the lens holder 132 includes a first portion 134 and a second portion 135 disposed on the first portion 134. The first portion 134 and the second portion 135 may be formed separately or as an integral unit.

Referring to FIGS. 2 and 3, the first portion 134 includes a top wall 1341 and a periphery wall 1342. The peripheral wall 1342 is disposed on the peripheral edge of the top wall 1341 to form a receiving space 1343 together with the top wall 1341. When the lens assembly 13 is disposed on the first surface 1111, the receiving space 1343 communicates with the receiving groove 1114, and the optical filter 131 is completely received in the space formed by the receiving space 1343 and the receiving groove 1114.

The lens 133 is disposed on the second portion 135. The second portion 135 defines a through hole 1351. The second portion 135 is disposed on the top wall 1341, and the through hole 1351 communicates with the receiving space 1343. The lens 133 is received in the through hole 1351.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A camera module comprising:
a baseplate;
a lens assembly; and
a bracket disposed between the baseplate and the lens assembly;
wherein the bracket comprises a support plate and a support member disposed on the support plate, the support plate comprises a first surface facing away from the baseplate and a second surface facing the baseplate, the support plate defines a first opening penetrating the first surface and the second surface, the lens assembly is disposed on the first surface and completely covers the first opening, the support member is located between the support plate and the baseplate, the support member comprises a first support portion and a plurality of second support portions arranged at intervals, the first support portion is disposed on the second surface and surrounds the periphery of the first opening, each of the plurality of second support portions extends outwards from an outer surface of the first support portion;
wherein the baseplate comprises a circuit board and a heat dissipation plate, the circuit board comprises a top surface facing the lens assembly and a bottom surface facing away from the lens assembly, the circuit board defines a second opening penetrating the top surface and the bottom surface, the heat dissipation plate is disposed on the bottom surface and covers the second opening, a portion of the heat dissipation plate is exposed to the top surface from the second opening.

2. The camera module of claim 1, wherein a projection of the support member onto the support plate is located inside the support plate.

3. The camera module of claim 1, wherein the support member is located between the top surface and the second surface.

4. The camera module of claim 3, further comprising an image sensor disposed on the portion of the heat dissipation plate which is exposed to the top surface, wherein the first support portion surrounds the image sensor.

5. The camera module of claim 3, further comprising a filling member, wherein a gap is defined between two adjacent second support portions, the filing member infills the gap and connects the support member, the second surface of the support plate, and the top surface of the circuit board.

6. The camera module of claim 3, wherein the lens assembly comprises an optical filter, a lens holder, and a lens, the optical filter is disposed on the first surface and completely covers the first opening, the lens holder is disposed on the first surface and covers the optical filter, the lens is disposed on the lens holder.

7. The camera module of claim 6, wherein the first surface is recessed toward the second surface to form a receiving groove, the receiving groove communicates with the first opening, and the optical filter is received in the receiving groove.

8. The camera module of claim 7, wherein the receiving groove comprises a groove bottom surface and a groove side surface, the groove side surface connects the groove bottom surface and the first surface, the optical filter is disposed on the groove bottom surface and completely covers the first opening.

9. The camera module of claim 8, wherein the groove bottom surface defines a gas escape groove, the gas escape groove communicates with the first opening.

10. An electronic device comprising a camera module, the camera module comprising:
a baseplate;
a lens assembly; and
a bracket disposed between the baseplate and the lens assembly;
wherein the bracket comprises a support plate and a support member disposed on the support plate, the support plate comprises a first surface facing away from the baseplate and a second surface facing the baseplate, the support plate defines a first opening penetrating the first surface and the second surface, the lens assembly is disposed on the first surface and completely covers the first opening, the support member is located between the support plate and the baseplate, the support member comprises a first support portion and a plurality of second support portions arranged at intervals, the first support portion is disposed on the second surface and surrounds the periphery of the first opening, each of the plurality of second support portions extends outwards from an outer surface of the first support portion;
wherein the baseplate comprises a circuit board and a heat dissipation plate, the circuit board comprises a top surface facing the lens assembly and a bottom surface facing away from the lens assembly, the circuit board defines a second opening penetrating the top surface and the bottom surface, the heat dissipation plate is disposed on the bottom surface and covers the second opening, a portion of the heat dissipation plate is exposed to the top surface from the second opening.

11. The electronic device of claim 10, wherein a projection of the support member onto the support plate is located inside the support plate.

12. The electronic device of claim 10, wherein the support member is located between the top surface and the second surface.

13. The electronic device of claim 12, wherein the camera module further comprises an image sensor disposed on the portion of the heat dissipation plate which is exposed to the top surface, the first support portion surrounds the image sensor.

14. The electronic device of claim 12, wherein the camera module further comprises a filling member, a gap is defined between two adjacent second support portions, the filing member infills the gap and connects the support member, the second surface of the support plate, and the top surface of the circuit board.

15. The electronic device of claim 12, wherein the lens assembly comprises an optical filter, a lens holder, and a lens, the optical filter is disposed on the first surface and completely covers the first opening, the lens holder is disposed on the first surface and covers the optical filter, the lens is disposed on the lens holder.

16. The electronic device of claim 15, wherein the first surface is recessed toward the second surface to form a receiving groove, the receiving groove communicates with the first opening, and the optical filter is received in the receiving groove.

17. The electronic device of claim 16, wherein the receiving groove comprises a groove bottom surface and a groove side surface, the groove side surface connects the groove bottom surface and the first surface, the optical filter is disposed on the groove bottom surface and completely covers the first opening.

18. The electronic device of claim 17, wherein the groove bottom surface defines a gas escape groove, the gas escape groove communicates with the first opening.

* * * * *